United States Patent
Turk

(10) Patent No.: US 7,206,763 B2
(45) Date of Patent: *Apr. 17, 2007

(54) METHOD AND SYSTEM FOR COMMODITY-BASED CURRENCY FOR PAYMENT OF ACCOUNTS

(75) Inventor: James J. Turk, North Conway, NH (US)

(73) Assignee: GM Network Limited (GB)

( * ) Notice: Subject to any disclaimer, the term of this patent is extended or adjusted under 35 U.S.C. 154(b) by 747 days.

This patent is subject to a terminal disclaimer.

(21) Appl. No.: 10/439,717

(22) Filed: May 16, 2003

(65) Prior Publication Data

US 2003/0191708 A1    Oct. 9, 2003

Related U.S. Application Data

(60) Continuation of application No. 09/340,566, filed on Jun. 28, 1999, which is a division of application No. 08/921,760, filed on Aug. 26, 1997, now Pat. No. 5,983,207, which is a continuation-in-part of application No. 08/465,430, filed on Jun. 5, 1995, now Pat. No. 5,671,364, which is a continuation-in-part of application No. 08/015,588, filed on Feb. 10, 1993, now abandoned.

(51) Int. Cl.
    *G06Q 40/00* (2006.01)
(52) U.S. Cl. ............... 705/39; 705/26; 705/37; 235/383
(58) Field of Classification Search ......... 705/37, 705/28, 39; 235/383
    See application file for complete search history.

(56) References Cited

U.S. PATENT DOCUMENTS

| | | | | |
|---|---|---|---|---|
| 3,573,747 A | 4/1971 | Adams et al. | ........... | 705/37 |
| 4,023,013 A | 5/1977 | Kinker | ........... | 235/61.7 |
| 4,312,510 A | 1/1982 | Bodner | ........... | 273/256 |
| 4,314,352 A | 2/1982 | Fought | ........... | 235/379 |
| 4,503,503 A | 3/1985 | Suzuki | ........... | 705/400 |
| 4,529,870 A | 7/1985 | Chaum | ........... | 235/380 |
| 4,538,816 A | 9/1985 | Figueroa | ........... | 273/256 |

(Continued)

FOREIGN PATENT DOCUMENTS

DE    2714386 A * 12/1988

OTHER PUBLICATIONS

Management and Strategy: Bankers Trust Sets Standards for 400 Derivatives Traders. *Trading Systems Technology*, v6, n19, Apr. 5, 1993, 5 pages.

(Continued)

*Primary Examiner*—Ella Colbert
*Assistant Examiner*—Harish T. Dass
(74) *Attorney, Agent, or Firm*—St. Onge Steward Johnston & Reens LLC

(57) ABSTRACT

A system and method for permitting gold or other commodities to circulate as currency requires a network of system users that participate in financial transactions where payment is made in units of gold. The gold is kept in secure storage at a deposit site for the benefit of the users. The payments in gold are effected through a computer system having data storage and transaction processing programs that credit or debit the units of account of gold held for the account of each system user.

30 Claims, 1 Drawing Sheet

U.S. PATENT DOCUMENTS

| | | | |
|---|---|---|---|
| 4,594,663 A | 6/1986 | Nagata et al. | 364/401 |
| 4,677,552 A | 6/1987 | Sibley, Jr. | 364/408 |
| 4,694,397 A | 9/1987 | Grant et al. | 705/42 |
| 4,759,063 A | 7/1988 | Chaum | 380/30 |
| 4,759,064 A | 7/1988 | Chaum | 380/30 |
| 4,795,892 A | 1/1989 | Gilmore et al. | 235/381 |
| 4,839,504 A | 6/1989 | Nakano | 235/379 |
| RE32,985 E | 7/1989 | Nagata et al. | 364/408 |
| 4,851,999 A | 7/1989 | Moriyama | 705/30 |
| 4,891,503 A | 1/1990 | Jewell | 235/380 |
| 4,903,201 A | 2/1990 | Wagner | 364/408 |
| 4,914,698 A | 4/1990 | Chaum | 380/30 |
| 4,926,480 A | 5/1990 | Chaum | 380/23 |
| 4,931,932 A | 6/1990 | Dalnekoff et al. | 364/407 |
| 4,933,842 A | 6/1990 | Durbin et al. | 364/408 |
| 4,947,430 A | 8/1990 | Chaum | 380/25 |
| 4,949,380 A | 8/1990 | Chaum | 380/30 |
| 4,960,981 A | 10/1990 | Benton et al. | 234/379 |
| 4,977,595 A | 12/1990 | Ohta et al. | 380/24 |
| 4,980,826 A | 12/1990 | Wagner | 705/37 |
| 4,985,833 A | 1/1991 | Oncken | 364/408 |
| 4,988,849 A | 1/1991 | Sasaki et al. | 235/379 |
| 4,994,964 A | 2/1991 | Wolfberg et al. | 364/408 |
| 5,010,485 A | 4/1991 | Bigari | 364/408 |
| 5,012,076 A | 4/1991 | Yoshida | 235/379 |
| 5,030,806 A | 7/1991 | Collin | 235/375 |
| 5,063,507 A | 11/1991 | Lindsey et al. | 364/408 |
| 5,101,353 A | 3/1992 | Lupien et al. | 364/408 |
| 5,117,356 A | 5/1992 | Marks | 705/30 |
| 5,131,039 A | 7/1992 | Chaum | 380/23 |
| 5,136,501 A | 8/1992 | Silverman et al. | 364/408 |
| 5,179,698 A | 1/1993 | Bachman et al. | 364/401 |
| 5,189,700 A | 2/1993 | Blandford | 713/178 |
| 5,220,501 A | 6/1993 | Lawlor et al. | 364/408 |
| 5,224,162 A | 6/1993 | Okamoto et al. | 380/24 |
| 5,258,908 A | 11/1993 | Hartheimer et al. | 705/37 |
| 5,276,736 A | 1/1994 | Chaum | 380/24 |
| 5,285,838 A | 2/1994 | Rapp et al. | 365/401 |
| 5,303,383 A | 4/1994 | Neches et al. | 395/500 |
| 5,420,405 A | 5/1995 | Chasek | 235/379 |
| 5,438,509 A | 8/1995 | Heffron | 395/670 |
| 5,453,601 A | 9/1995 | Rosen | 235/379 |
| 5,455,407 A | 10/1995 | Rosen | 235/380 |
| 5,477,038 A | 12/1995 | Levine et al. | 235/380 |
| 5,493,614 A | 2/1996 | Chaum | 380/30 |
| 5,511,121 A | 4/1996 | Yacobi | 380/24 |
| 5,521,980 A | 5/1996 | Brands | 380/30 |
| 5,539,825 A | 7/1996 | Akiyama et al. | 380/24 |
| 5,548,110 A | 8/1996 | Storch et al. | 235/472 |
| 5,623,547 A | 4/1997 | Jones et al. | 705/68 |
| 5,666,493 A | 9/1997 | Wojcik et al. | 705/26 |
| 5,671,364 A | 9/1997 | Turk | 705/39 |
| 5,812,668 A | 9/1998 | Weber | 380/24 |
| 5,832,089 A | 11/1998 | Kravitz et al. | 380/24 |
| 5,850,446 A | 12/1998 | Berger et al. | 380/24 |
| 5,898,154 A | 4/1999 | Rosen | 705/69 |
| 5,983,207 A | 11/1999 | Turk et al. | 705/39 |
| 6,119,946 A | 9/2000 | Teicher | 235/492 |
| 6,122,625 A | 9/2000 | Rosen | 705/68 |
| 6,188,993 B1 | 2/2001 | Eng et al. | 705/37 |

OTHER PUBLICATIONS

Lee, P. and Ghosh, S. Novahid: A Novel Architecture for Asynchronous, Hierarchial, International, Distributed, Real-Time Payments Processing. *IEEE Journal of Selected Areas in Communications*, v12, n6, pp. 1072-1087. Aug. 1994.

DigiCash—Company Brochure. *DigiCash—Numbers That Are Money*. Jun. 11, 1997, 4 pages.

William. The rise of electronic payments networks and the future role of the Fed with regard to payment finality. *Economic Review*. V78n2, pp. 1-22 . Dialog File 15, Accession No. 00739433, Mar. 1993.

Juncker et al. A primer on the settlement of payments in the United States. *Federal Reserve Bulletin*. col. 77, No. 11, Nov. 1991.

O'Mahony et al. *Electronic Payment Systems*. 1997, Artech House, Inc., pp. 146-147.

Fifty Dollar Gold Certificate dated Sep. 1, 1882.

Five Dollar Silver Certificate dated 1953.

Hayek; *Choice in Currency—A way to stop inflation*. The Institute of Economic Affairs. 1976.

Muhammad. Electronic commerce and the future of money. *Black Enterprise* v27n11, pp. 255-261. Dialog File 15, Accession No. 01427279. Jun. 1997.

Giles. Electronic commerce. *Network VAR*. v5 n5, p. 26(7). Dialog File 15, Accession No. 02069436. May 1997.

Chaum. Achieving Electronic Privacy. *Scientific American*. pp. 96-101, Aug. 1992.

Various authors. NEC ResearchIndex results showing excerpts of articles citing Medvinsky. NetCash: A design for practical electronic currency on the Internet, *Proceedings of the First ACM Conference on Computer and Communications Security*. 1993.

Various authors. NEC ResearchIndex results showing excerpts of articles citing Chaum. Achieving Electronic Privacy. *Scientific American*. Aug. 1992. pp. 96-101.

Gayle. *Offline digital cash unsuitable to current legal environment*. http://www.interesting-people.org/archives/interesting-people/199307/msg00009.html, Jul. 3, 1993.

Newsgroup Posting; From: Howard Gayle, Subject: Why digital gold?, Newsgroup: talk.politics.crypto, Date: Dec. 04, 1993.

Newsgroup Posting; From: Timothy C. May, Subject: Scenario to Ban Cash Transactions?, Newsgroups: sci.crypt, alt.privacy, comp.org.eff.talk, Date: Nov. 25, 1992.

Newsgroup Posting; From: David A. Smith, Subject: Re: Netopia, Newsgroups: alt.cyberpunk, Date: Sep. 2, 1993.

Newsgroup Postings—messages 21-30 from thread; From: various authors, Subject: Re: Netopia. Newsgroups: alt.cyberpunk, Date: Aug. 30, 1993-Sep. 7, 1993.

Hanh. *Truly Anonymous Digital Cash Can Never Work*. http://www.Iclark.edu/~loren/cyberlaw97/hanh1.html. undated.

Hardy. *The Digital Silk Road*. http://www.virtualschool.edu/mon/Bionomics/Extropians/HardyT ribbleSilkRoad.html, undated.

Dougherty. *Making Sense Out of Digital Currency*. http://www.china.si.umich.edu/econ495/writings/paper/Dougherty.html, undated.

List of Articles (authored by C. Chaum), http://www.chaum.com/articleslist_of_articles.htm, undated.

Winn. Clash of the Titans: Regulating the Competition Betweeen Established and Emerged Electronic Payment Systems. *Berkeley Technology Law Journal*, undated.

Planetgold patent Wars Page—Latest News Nov. 15, 2001, http://planetgold.com/Interview.asp?SPID=32967996, Nov. 15, 2001.

Rahn, et al. Research Study 24—Digital Money & Its Impact on Gold: Technical, legal and economic issues. *Centre for Public Policy Studies*. Nov. 2000.

Davies. *Electronic Money, or E-Money, and Digital Cash*. http://www.ex.ac.uk/~Rdavies/ariah/emoney.html, Apr. 30, 2002.

Mackie-Mason. *Readings (Preliminary)*, http://www-personal.umich.edu/~jmm/courses/si760/readings.html, Nov. 8, 1998.

Turk. *Money and Currency in the $21^{st}$ Century*. http://www.goldmoney.com/futuremoney.html, Jul. 1997.

Rahn, et al. *Digital Money & It's Impact on Gold: Concerns & Issues*. http://www.goldbankone.com/article.php?op=Print&sid=105, Jul. 12, 2001.

Konig The Evolution of Money—From Commodity Money to E-Money. *UNICERT IV Program*. Jul. 6, 2001.

New World Intelligence report of unknown title, 2002.

Unknown author. *The e-money mandate.*, Http://www.finextra.com/fullfeature.asp?id=256, May 24, 2002.

Unknown author. *Digital or Just Gold?*. http://www.goldecomony.com/article.php?sid=187, May 22. 2002.

North. *Gold Standards: The Good, The Bad, and The Ugly*. http://www.lewrockwell.com/north/north108.html, Jun. 21, 2002.

Committee on Payment and Settlement Systems et al., Security of Electronic Money. *Bank for International Settlements*. 1996.

May. *Digital Cash and Net Commerce*. http://ftp.easynet.nl/mirror/munitions/documents/cyphernomicon/chapter12/12.1.html. Sep. 10, 1994.

McAndrews. Making Payments on the Internet. *Business Review—Federal Reserve Bank of Philadelphia*. Jan./Fed 1997. pp. 3-14.

* cited by examiner

METHOD AND SYSTEM FOR COMMODITY-BASED CURRENCY FOR PAYMENT OF ACCOUNTS

RELATED APPLICATIONS

This is a continuation application of co-pending U.S. patent application Ser. No. 09/340,566 filed 28 Jun. 1999 entitled "Electronic Cash Eliminating Payment Risk" which is a divisional application of U.S. patent application Ser. No. 08/921,760 filed 26 Aug. 1997 (now issued as U.S. Pat. No. 5,983,207) entitled "Electronic Cash Eliminating Payment Risk", which is a continuation in part of application Ser. No. 08/465,430, filed 5 Jun. 1995 (now issued as U.S. Pat. No. 5,671,364) entitled "Method and Systems for Commodity-Based Currency for Payment of Accounts and Elimination of Payment Risk"; which is a continuation in part of application Ser. No. 08/015,588, 10 Feb. 1993 entitled "Method and Systems for Commodity-Based Currency for Payment of Accounts"; now abandoned.

FIELD OF THE INVENTION

This invention relates to electronic transaction systems, and more specifically to a system using an asset-based electronic cash system, for settlement of payment obligations.

BACKGROUND OF THE INVENTION

In the historic past, precious metals circulated as currency. The metals circulated mainly in the form of coins, and over time improvements were made to coins to improve their reliability. These improvements included, for example, detailed engraving on the face and obverse of the coin, and milling of edges. These improvements were intended to prevent the clipping of coins, which was a process that lightened the weight of the coin. When this practice occurred, the coin was debased, i.e., it lost purchasing power because the coin no longer constituted the weight of gold it was purported to constitute.

The circulation of precious metals coins was in time supplanted by certificates during the period from 1680-1840. By this method of currency, the coins of precious metal remained in safe and secure storage, typically a vault facility maintained by a bank or warehouse company. A certificate of deposit, a paper document, was issued by the bank or warehouse company and evidenced the deposit of coin that had been made into the facility, and the certificate of deposit began circulating as a substitute for the coin. Circulation of the certificate, in lieu of the coins, offered numerous advantages. Paper was easier to transport, and a relatively small amount of certificates could be used to complete transactions of high value. There was less risk of debasement of the coin that was stored. However, while these advantages significantly improved the circulating medium, there were also disadvantages. These included forgery of paper certificates, fraud and bankruptcy of the bank or warehouse company.

As a result, another improvement to currency soon emerged. This improvement in the nature of currency was the creation of deposit currency. Deposit currency is a process that enables paper money and/or coin to circulate as currency. By this method of currency, the coins of precious metal and/or the paper currency that represented a claim to those coins, remained in safe and secure storage, typically a vault facility maintained by a bank. Circa 1840 to the present, the circulation of coin and paper money for commercial transactions was supplanted by deposit currency, i.e., money is now moved around mainly by checks and wire transfers.

The creation of deposit currency significantly improved the circulating medium. It was no longer necessary to extensively rely on coins, which could be clipped, debased, etc., nor on paper money, which could be counterfeited. By moving monetary units of account on deposit in one bank to another bank, the process of payments was significantly enhanced.

However, in time unforeseen problems have appeared which detract from the use of deposit currency as a medium of exchange. The institutions in which clients lodge their money and deposit currency sometimes are unable to meet their commitment to their clients to return the clients' coin or paper money. The institutions, typically banks, which accept the deposits of coin and paper money from their client, loan the coin and paper money to other clients. Occasionally these borrowers failed to repay their loans, causing the bank to take a loss. Cumulatively these losses can be large enough to cause the bank to fail. A bank in that case no longer has sufficient coin or paper money to repay its liabilities to its clients.

The above described scenario constitutes what is known as "payment risk." As illustrated above, payment risk arises in conventional banking systems where a financial institution accepts deposits, then in turn loans out that money to others. This is known as "fractional banking," in that the financial institution only keeps on hand a fraction of the actual assets it is holding for the account of its depositors. If the financial institution fails due to bad loans or fraud, the financial institution lacks sufficient assets to pay off its depositors. This practice has lead to significant losses in connection with financial institution failures such as at the Herstatt Bank in Germany and the BCCI scandal.

A related payment risk arises due to the fluctuating value of national currencies due to inflation and currency exchange rate variations dependent on the economy of the nation issuing the currency. Thus, there is a risk inherently associated with the use of national currencies.

A further problem of current payment systems is the problem of "float." "Float" is the amount of time a payee must wait for a transaction to be processed. This is considered an expense because of the unavailability of funds, which represents opportunity costs.

In order to eliminate these payment risks and float, I have invented a system which uses an asset (like gold) instead of a liability (national currency) for settling payments.

SUMMARY OF THE INVENTION

It is an object of the invention to provide a method and system for a commodity-based currency for payment of accounts that avoids the problems of prior art and deposit currency account systems. It is an object of the invention to provide such a system and method which is independent of external events that cause fluctuations in value of national currencies. It is an object of the invention to provide such a system and method that permits gold and other commodities to circulate as deposit currency.

In accordance with one embodiment of the invention, a commodity based currency system for paying accounts comprises: at least one deposit site having secure facilities for storage of a valuable commodity; an amount of a commodity stored at the deposit site; and a computer system for implementing and recording transactions defined in units of the commodity. The accounting of the transactions is denominated in units of the commodity. The computer system includes: an account data storage device, a transaction data storage means, and a transaction posting means. The account data storage device is capable of recording data identifying persons and a number of units of the commodity credited to each of the persons and held in the deposit site for the account of the persons. The transaction data storage device receives records of transactions denominated in units of the commodity. These records of transactions include an identification of a person who will receive a debit, a person who will receive a credit, the amount of such debit, the amount of such credit, and the identity of the deposit site. The transaction posting means extracts data from the records of transactions and posts debits and credits to the account data storage device to update the data identifying the number of units of the commodity held for the account of each person involved in the transaction.

The system preferably permits remote access to submit transaction records, and provides verification means for verifying the bona fides of the person seeking to submit transaction records. A remote terminal is provided at the deposit site to enter information regarding the commodity held at the deposit site for the account of a person.

In a preferred embodiment, the commodity comprises a precious metal, such as silver, or most preferably, gold of a specified purity.

Other objects, aspects and features of the present invention in addition to those mentioned above will be pointed out in or will be understood from the following detailed description provided in conjunction with the accompanying drawings.

DESCRIPTION OF THE PREFERRED EMBODIMENT

Figure 1:
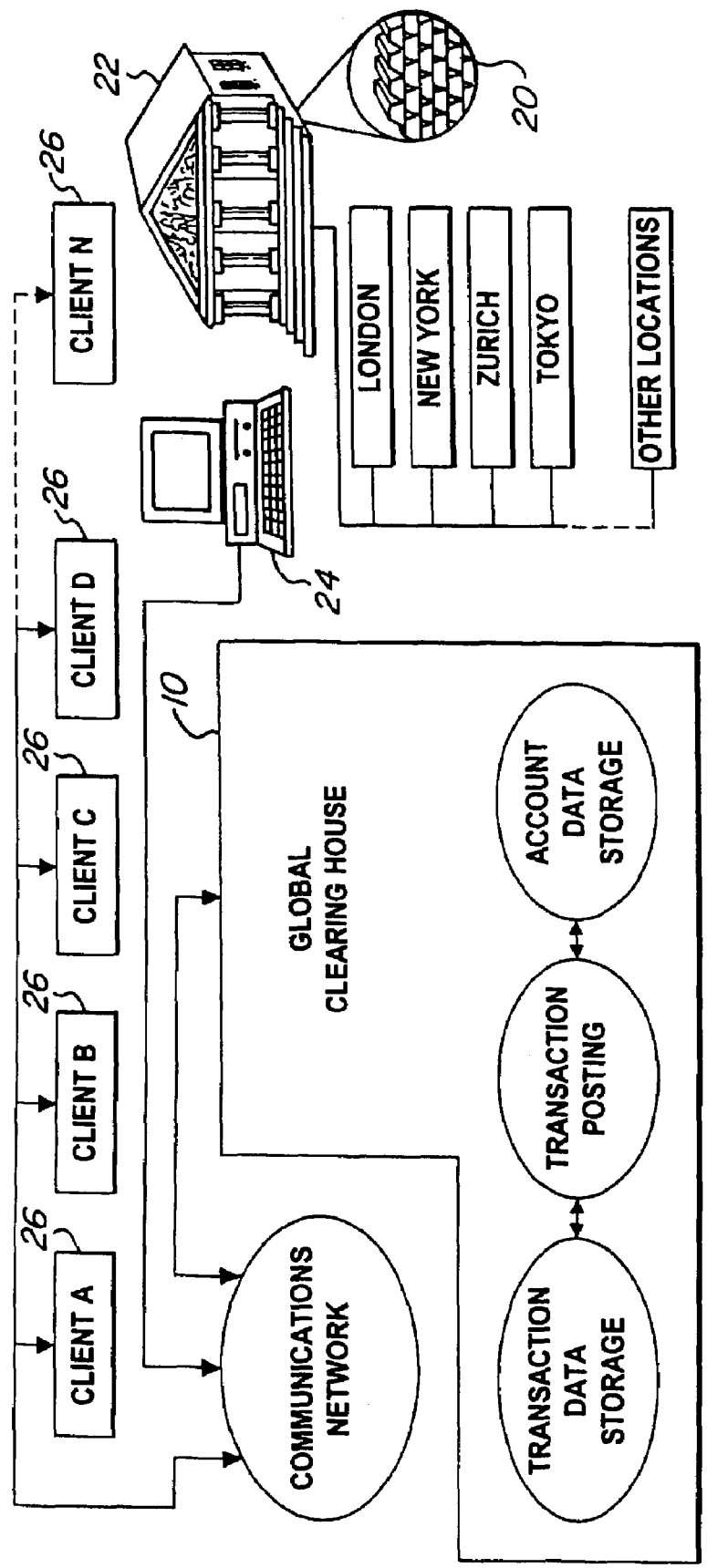
FIG. 1 is a schematic illustration of the operation of the invention.

I hereby incorporate by reference my prior patents, U.S. Pat. Nos. 5,671,364; 5,983,207; and 6,415,271, in their entirety.

A glossary of the terms used in the present application is provided hereafter.

As used herein, a "computer system" comprises at least the following components: a central processing unit (CPU), a display device, a data storage device, and a printing capability.

As used herein, "money" is a tool that enables the participants in an exchange of goods and services to define value of the exchange.

As used herein, "currency" means the physical representation of money. Currency is the medium of exchange enabling producers and consumers to exchange goods and services indirectly for other goods and services. Currency is denominated into units of account, which permits economic calculation by the participants in the exchange. Currency also is a means of payment which enables the participants in an exchange to settle their respective obligation.

As used herein, "cash currency" is the paper notes issued by a country's central bank. Each note is denominated in terms of a fixed number of units of account.

As used herein, "deposit currency" is the liability of the banks that accept deposits of a country's national currency.

As used herein, a "clearing house" is a center for processing transactions to credit and debit accounts held by parties to the transaction.

This invention relates to a system and method for payment and receipt of monetary units of account. More specifically, it relates to a clearing house 10 that is the center of an interactive communications network that will enable gold and/or other commodities to be used and freely exchanged as a means of payment, i.e., to be used as currency.

The clearing house is intended to develop an extensive user base located within the United States and globally that will use gold and/or other commodities as a currency for effecting payments in cross-border as well as intra-country commercial transactions. Since this currency is preferably a defined weight of gold or other commodity, the currency of the clearing house will be non-national.

Each system user individually establishes a depository account with the clearing house either by storing gold or other commodity at an affiliated deposit site 22 or by purchasing gold or other commodity already stored at such a deposit site. The deposit site will confirm the deposit of the commodity to the clearing house and transmit the information via remote terminal 24 to the computer system 26 described hereafter. Each account will be denominated in the currency of the clearing house, which is a defined quantity of gold or other commodity (for example, ounces, or kilograms of gold, barrels of oil, etc.). Every system user that establishes an account relationship with the clearing house will become a participant in the network of system users using the payment processing capability provided by the clearing house.

The network of individuals, corporations and other entities that are clients of the clearing house will use communications and information processing technology made available to them by the clearing house to effect transactions in the commodity denominated currency of the clearing house. They will (1) make payments to other members of the network, generally their suppliers, and (2) collect payments from other members of the network, generally their customers.

Though it is envisioned that the clearing house will initially establish working relationships with corporations involved in international trade and commerce, the economies of scale that will be generated by an increasing number of transactions completed through the clearing house means that in time the scope of the clearing house activities can be broadened to include transactions by individuals. The high volumes of payments and receipts now undertaken daily in the course of normal economic activity indicate that the potential opportunities for the application of this invention are very significant.

This invention therefore provides a system and method of settling of payments for transactions through a clearing house with a global scope of operation (hereafter referred to as "Global Clearing House" or "GCH").

The advantages that GCH will offer system users, which differentiates its services from other payments mechanisms now available, include (1) the ability to complete a payment without incurring the risk now inherent in existing mechanisms used to complete payment transactions, (i.e., possible loss of funds deposited in a bank which is seized or which is insolvent), (2) the ability for a client to receive immediate credit and to be immediately informed that monetary units of account have been added to the account kept by the client at GCH, (3) the ability for a client to make immediate payment and to be immediately informed that monetary units of account have been deducted from the account kept by the client at GCH, (4) the ability of a client to maintain monetary units of account on deposit without being exposed to the practice of fractional reserve banking (wherein banks do not keep as a reserve assets equal to the amount and identity of their liabilities) and thereby avoid the risks of partial or total loss of the deposit as a result of the overissue of the currency (where banks create liabilities for currency based on assets which they do not have on hand), (5) the ability of a client to maintain monetary units of account on deposit without being exposed to the risk that those monetary units of account will be loaned by the institution, and (6) the ability to use gold and/or other commodities as currency.

Gold is the preferred commodity as it is a low-risk medium of payment and it has a known value. Gold extinguishes the obligation arising from a transaction in trade and commerce. When the seller receives gold, there is no further obligation because the product sold has been exchanged for a tangible asset. However, a national currency does not necessarily extinguish the obligation incurred when the buyer acquires a product. The seller does not receive a tangible asset. When the seller instead receives a national currency, the seller receives a promise to pay, which is principally dependent upon the central bank which issues the national currency. The obligation can be further at risk if the payment clearing bank is unable to meet its obligations to deliver the currency specified in a transaction.

Using gold as currency also permits the creation of financial instruments and futures contracts denominated in terms of a stated weight of gold. For example, a futures contract for delivery of soybeans could be designated payable in gold units of account instead of in U.S. Dollars. Other commonly traded commodities, i.e., crude oil, agricultural products, etc., could be similarly designated in gold units of account. The transactions would then be processed and cleared through GCH.

The above advantages differentiate the commodity currency processed by GCH from any deposit currency now in use.

Referring now to FIG. 1, a commodity based currency system for paying accounts in accordance with the invention comprises: at least one deposit site; an amount of a commodity stored at the deposit site; and a computer system for implementing and recording transactions defined in units of the commodity.

The Deposit Sites

Preferably there are several deposit sites for storing the commodity. The deposit sites are preferably located in countries having secure and stable political systems where there is minimal risk of misappropriation of the asset by the government or private persons. The deposit site will typically be a bank; however, other secure vault facilities could also serve as the deposit site. Typical site locations would be London, New York, Zurich and Tokyo, as well as other locations.

The deposit site provides facilities for safe and secure storage of the commodity to be used for currency. Typically such deposit site consists of a protected vault. The bank or protected vault that is servicing the GCH system users will preferably have the ability to (1) receive the commodity from a client, (2) return the commodity to a client, (3) test the purity of the commodity, (4) measure the weight and/or other physical properties of the commodity, (5) provide identifying information for each parcel of the commodity placed within the deposit site in order to distinguish between the different parcels belonging to the different clients of the deposit site, (6) report to the client the quantity of the commodity stored by the client at the deposit site, and (7) provide identifying information and the capability to physically separate from the total quantity of the commodity stored in the deposit site those parcels of the commodity to be designated for use as currency. These functions can be provided by the bank or vault or by trusted service providers.

The Commodity

The commodity must be non-perishable, and most preferably has a high ratio of value to weight and volume. In a preferred embodiment, the commodity comprises a precious metal, such as silver, or most preferably, gold of a specified purity. However, several other commodities, notably crude oil and other petroleum products may also serve as the commodity used to designate units of account in the system.

Gold has three unique advantages as money. Each of these are inherent to gold, and they are not advantages available to any national currency.

When defined to a precise weight, gold is a consistent and unvarying unit of account. An ounce of gold is knowable and unvarying. An ounce today is the same as an ounce yesterday or an ounce twenty years ago. However, a national currency does not have these characteristics. A U.S. Dollar or a Deutschemark or a Swiss Franc on deposit in Bank AAA is not the same as the same currency on deposit at Bank CCC because these two banks have different levels of capital and a different mix of assets. Therefore, Dollars or other currencies on deposit in these unrelated institutions have entirely different levels of risk, so the national currency is not a consistent and unvarying unit of account.

Gold is non-national money, which means that it is outside the scope of government. Therefore, gold is not subject to the political process because it is beyond the control of governments, their central banks and monetary authorities. The result is that gold over long periods of time tends to hold its purchasing power better than any national currency. And as set forth above, gold extinguishes an obligation on delivery.

Opening of an Account

The system and process of the invention require system users to establish account relationships with GCH. The account relationship is confirmed when a system user deposits gold with GCH in one or more of GCH's approved depositories. A system user makes a gold deposit or purchases another person's gold deposit and does so at a specific site. The deposit site then notifies the GCH by data transmission of the identity of a person and units of gold held for the account of that person that gold is available for settling transactions for the benefit of that user.

In particular, additions of currency to the system will be made in the following way: (1) the system user transfers a quantity of the commodity to be used as currency to a deposit site; or (2) the system user notifies the deposit site to earmark all or part of the quantity of the commodity stored at the deposit site by the user. In the first case, the deposit site verifies the receipt of the commodity and provides confirmation to the system user and GCH specifying the quantity and/or other physical attributes of the commodity. In the second case, the deposit site separates the earmarked parcels of the commodity to be used as currency in a separate area of the deposit site designated solely for use of storing earmarked parcels of the commodity comprising the currency of the GCH. Once the physical transfer is completed, the deposit site notifies the GCH that the commodity has been established as currency by the system user.

The GCH then credits the account previously established by the system user at the GCH with the quantity of the commodity specified by the system user which has been established as currency and has been credited to the account of the system user. Once established in this way, the commodity earmarked at the deposit site becomes eligible for use as currency, and the system user may transfer all or part of the commodity units of account to another account within the system.

The balance sheet of GCH reflects (1) the cumulative deposits of its system users, which are liabilities of GCH, and (2) the identical amount of gold as its assets. GCH's financial position is presented in Table No. 1.

TABLE No 1

| GCH Balance Sheet Before Transactions | | | | |
|---|---|---|---|---|
| Assets | | | Liabilities | |
| Gold Stored in London | 100 oz. | Client A | 100 oz. | London |
| Gold Stored in Zurich | 100 oz. | Client A | 100 oz. | Zurich |
| Gold Stored in New York | 175 oz. | Client B | 175 oz. | New York |
| | 375 oz. | | 375 oz. | |

The Computer System

Once a system user establishes an account relationship with GCH, the user has access to an interactive communications network giving access to a computer system. When two system users enter into a trade transaction between themselves, they effect payment through this network. In a typical implemntation of the invention, the interactive communications network is the internet.

The GCH computer system is adapted for storing of data and entering the accounts and the transactions affecting the accounts of the participants in the system. Each GCH system user is provided with the means to conduct transactions in the user's account maintained with the GCH. Each account typically includes the name, address and other identifying information of the account holder, a unique account number assigned to each account, an inventory of transactions conducted through each account, and the means to verify the accuracy and authenticity of each transaction conducted for an account when instructed by the account holder. In logging to the system, the user will typically use an account number to identify himself, and will use a password as verification to gain access the account.

The computer system thus includes an account data storage device, a transaction data storage means, and a transaction posting means.

The account data storage device is capable of recording data identifying the system user and a number of units of the commodity credited to the user and held for the account of the user.

The transaction data storage means receives and stores records of transactions which are denominated in units of the commodity. These records of transactions include an identification of a system user who will receive a debit, a system user who will receive a credit, the amount of such debit, the amount of such credit, and, optionally, may also identify the identity of the deposit site.

The transaction posting means extracts data from the records of transactions and posts debits and credits to the account data storage device to instantly update the data identifying the number of units of the commodity held for the account of each person involved in the transaction.

The system includes a remote terminal 24 at the deposit site 22 for receiving and sending data to the computer system upon opening or closing of an account and/or when there is a transfer of units of gold. The data is transmitted from the deposit site to the transaction data storage device and includes an identification of units of the commodity 20 held at the site for the account of such person.

The system preferably permits remote access from client terminals 26 to submit transaction records to the system 10, and provides verification means for verifying the bona fides of the person seeking to submit transaction records. This permits the user access to the computer system through an interactive communications network from a location remote from either the GCH or the deposit site.

Typically, the account holder will use a computer which instructs a modem which provides access to the computer system by dialing telephone numbers available to the GCH system users; or will access the system via an encrypted internet connection. Once the centralized computer of the GCH 10 is accessed in this way and once entry is made by providing a series of passwords or security codes to prevent unwarranted and unwanted access, the GCH client has access to the chosen account to which it is the account holder. Once access has been granted, the account holder may review the account, conduct transactions for the account, review past transactions or other data stored by the centralized computer for the account.

Access to the centralized computer of the GCH permits real time, instantaneous transfers of units of account. To transfer units of account of the commodity in order to complete a financial obligation, the system user (hereafter the "paying client") instructs the GCH (1) to debit from the paying client's account a specified quantity of the commodity, (2) the day and time the specified quantity of the commodity is to be transferred, (3) the account number and other verifying information to specify the identity of the client (hereafter the "receiving client") to whom the payment will be made. A password may optionally be required at the time of posting a transaction, in order to provide security and protection from unauthorized transactions, however, in most instances, the use of a password at logon to the system will be considered sufficient.

The centralized computer of the GCH collects the transfer instructions provided by the paying client and enters those instructions into a transaction file maintained to record the authorized transactions for all paying clients. When the appointed day and time is reached, the centralized computer of the GCH completes the transaction by debiting the account of the paying client for the quantity of the commodity instructed by the paying client, and simultaneously credits the account of the receiving client instructed by the paying client. The credit made to the account of the receiving client is made simultaneously as a debit of the account of the paying client. Once the credit of the commodity units of account is made to the designated account of the receiving client, the receiving client has immediate access to those commodity units of account, thereby extinguishing the obligation of the paying client to the receiving client.

For example, A and B enter into a transaction in which A agrees to purchase from B a specific good/service. The price is agreed between them to be 25 ounces of gold. GCH is then instructed by A to debit A's account for 25.0000 ounces and pay this amount to B's account. Accounting of gold in ounces should be to at least four decimal points, though five or more decimal points could be used if greater precision in the measurement of value in the exchange is required.

GCH confirms immediate payment to both A and B. The gold is not moved from the storage facility. It remains in the same location, but it is now stored there by GCH for the account of B instead of A. This changed position is presented in Table No. 2.

The total assets and liabilities of GCH remain unchanged. Only the composition of the liabilities changes, and it only changes after GCH performs its payments function.

The net result of this transaction is that gold is circulating as currency. Gold is used as a monetary unit of account in a transaction of trade and commerce entered into between A and B, and it therefore is circulating as currency even though it remains in safe and secure storage.

TABLE No 2

GCH Balance Sheet After Transactions

| Assets | | Liabilities | |
|---|---|---|---|
| Gold Stored in London | 100 oz. | Client A 100 oz. | London |
| Gold Stored in Zurich | 100 oz. | Client A 75 oz. | Zurich |
| | | Client B 25 oz. | Zurich |
| Gold Stored in New York | 175 oz. | Client B 175 oz. | New York |
| | 375 oz. | | 375 oz. |

GCH uses a tangible asset (i.e., a defined weight of gold) as the basic monetary unit of account. GCH is a clearing house with assets that are identical to its liabilities. In other words, GCH does not monetize debts and thereby turn the debt obligations of borrowers into currency. GCH will have on hand as an asset the total weight of gold it owes to its depository clients. The Monetary Balance Sheet of GCH is substantially different than that of the Dollar, any national currency, or any existent bank as shown in Table 3.

TABLE No 3

Monetary Balance Sheet of Global Clearing House
(Denominated in Units of Account Called Ounces)

| "Quality of Money" Assets | | "Quantity of Money" Liabilities | |
|---|---|---|---|
| Gold Stored in Secure Storage | 375 oz. | Client Deposits | 375 oz. |
| | 375 oz. | | 375 oz. |

In contrast to any national currency, the "quality of money" is identical to the "quantity of money" on the balance sheet of GCH. This common identity of assets and liabilities illustrates a unique advantage available to users of the invention. Identical assets and liabilities provides certainty that payments will be made as directed and without risk.

Closing of an Account

A system user can subsequently "cash out" of the GCH system by either (1) selling his gold interest to another; (2) withdrawing the user's gold deposited at a deposit site. At this point, the deposit site will notify the GCH that the system user's gold units of account are no longer available to the system, for example, by entering information in the remote terminal at the deposit site.

In summary, the invention comprises an electronic commodity based system for conducting financial transactions, comprising: (1) at least one deposit site having secure facilities for storage of a commodity; (2) an inventory of a valuable commodity stored in the secure facilities at a deposit site, with units of the valuable commodity held at the deposit site for an identified account; and (3) a computer system for processing data for accounting transactions denominated in units of the commodity. As would be understood, the identified account can be owned by an individual or a legal entity, such as a corporation, limited liability company, or partnership, or a government. The account can be "identified" simply by an account number, such as has been provided by so-called "numbered" Swiss or Caribbean bank accounts, or by a more complete information set specifying name, address, contact etc. The identification must be such to allow debiting and crediting of the proper parties to any transaction. It should be noted that the units held for an identified account can be a direct holding, e.g., specific units of commodity held at a specific site can be held for a specific account, or a group of units of commodity can be held for a group of accounts, or an indirect holding, e.g., the units of commodity held at one or more sites can be held in a trust for the benefit of all of the accounts open in the system.

The computer system has data storage devices such as a hard drive, optical drive, RAM memory devices, flash memory devices, optical storage units or the like, and data processing software that records a balance of units of commodity credited to each account. The software receives records of transactions transferring an interest defined in units of the commodity from one account to another identified account. The records of transactions include at least an identification of an account that will receive a debit, an account that will receive a credit, an amount of a debit of a quantity of said units of said commodity, and an amount of a credit of a quantity of said units of said commodity. These records of transactions are entered to update data regarding the balance of units of commodity credited to each account. The electronic commodity based system permits persons to conduct financial transactions without reliance on national currencies in conducting said financial transactions whereby obligations, of a person receiving a said debit of said units of said commodity of the person's account, to an other person receiving a said credit of said units of said commodity to the other person's account, are extinguished upon posting of said records of transactions, thereby eliminating payment risk.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An electronic commodity based system for conducting financial transactions, comprising:
    at least one deposit site having secure facilities for storage of a valuable commodity;
    an inventory of a valuable commodity stored in said secure facilities at a said deposit site, said inventory including a quantity of units of said valuable commodity held at said deposit site for at least one identified account;
    a computer system for processing data for accounting transactions denominated in said units of said valuable commodity, said computer system having at least one data storage device and data processing software that records a balance of units of valuable commodity credited to each said account; said software being operable to receive records of transactions transferring an interest in units of said valuable commodity from one account to another identified account; said records of transactions including at least an identification of a first account that will receive a debit, and a second account that will receive a credit, an amount of the interest in said units of said valuable commodity which is being credited to said second account, said records of transactions thereby up-dating data regarding the balance of units of valuable commodity credited to each said account; said electronic commodity based system permitting persons to conduct financial transactions without reliance on national currencies in conducting said financial transactions, whereby obligations, of a person receiving a said debit of said units of said valuable commodity of the person's account, to an other person receiving a said credit of said units of said valuable commodity to the other person's account, are extinguished upon posting of said records of transactions, thereby eliminating payment risk.

2. A system in accordance with claim 1 wherein said valuable commodity comprises a precious metal.

3. A system in accordance with claim 2 wherein said precious metal comprise gold.

4. A system in accordance with claim 2 wherein said precious metal comprise silver.

5. A system in accordance with claim 3 wherein said gold is specified to a selected purity.

6. A system in accordance with claim 2 further comprising means for remote access to submit records of transactions to instantly debit and credit a person's accounts.

7. A system in accordance with claim 6 further comprising verification means for verifying the identity of said person obtaining access to said computer system and for confirming that said person is authorized to submit records of transactions to said transaction storage device.

8. An electronic gold based system for conducting financial transactions, comprising:
   at least one deposit site having a protected vault;
   an inventory of gold stored in said protected vault at a said deposit site, said inventory including a quantity of units of gold held at said deposit site for an account of at least one identified account;
   a computer system for processing data for accounting transactions denominated in said units of gold, said computer system having at least one data storage device and data processing software that records a balance of units of gold credited to each said account; said software being operable to receive records of transactions transferring an interest in units of gold from one account to another identified account; said records of transactions including at least an identification of a first account that will receive a debit, and a second account that will receive a credit, an amount of the interest in said units of gold which is being credited to said second account, said records of transactions thereby updating data regarding the balance of units of gold credited to each said account; said electronic gold based system permitting persons to conduct financial transactions without reliance on national currencies in conducting said financial transactions, whereby obligations, of a person receiving a said debit of said units of gold of the person's account, to an other person receiving a said credit of said units of gold to the other person's account, are extinguished upon posting of said records of transactions, thereby eliminating payment risk.

9. A system in accordance with claim 8 further comprising means for remote access to said computer system to submit and store records of transactions.

10. A system in accordance with claim 8 wherein said gold is of a selected purity.

11. A method of payment, using a valuable commodity as a deposit currency, implemented by a computer system, comprising the steps of:
    creating a deposit account data file for each of a plurality of persons, each said deposit account data file identifying a person, and a number of units of valuable commodity stored at a deposit site for the benefit of the person;
    entering records of transactions denominated in units of said valuable commodity, said records of transactions including at least an identification of a person who will receive a debit, a person who will receive a credit, the amount of such debit in units of said valuable commodity, the amount of such credit in units of said valuable commodity;
    posting said records of transactions to debit and credit the deposit account data files of said persons to update said data identifying a number of units of said valuable commodity held for the account of each said person;
    said method permitting persons to conduct financial transactions without reliance on national currencies in conducting said financial transactions whereby obligations, of a person receiving a said debit of said units of said valuable commodity, to another person receiving a said credit of said units of said valuable commodity, are extinguished upon posting of said records of transactions, thereby eliminating payment risk.

12. A method in accordance with claim 11 wherein said valuable commodity comprises a precious metal.

13. A method in accordance with claim 12 wherein said precious metal comprises gold.

14. A method in accordance with claim 12 wherein said precious metal comprises silver.

15. A method of payment, using an electronic valuable commodity-based payment system which does not permit fractional banking, comprising the steps of:
    using a user computer operably connected to a communications network to obtain access to the electronic valuable commodity-based payment system;
    entering one or more of an account number and a password to obtain access to a user account;
    entering instructions on said user computer to be transmitted to said electronic commodity-based payment system, said instructions including a specification of a number of units of a valuable commodity to be transferred from said user account and an identification of a recipient to receive payment of a number of units of the valuable commodity;
    said method permitting a user to make a payment without reliance on national currencies in conducting said financial transactions, thereby eliminating payment risk.

16. A method in accordance with claim 15 wherein said valuable commodity comprises a precious metal.

17. A method in accordance with claim 16 wherein said precious metal comprises gold.

18. A method for facilitating financial transactions, comprising:
    recording in memory of a computer system a first balance for a first account, said first balance representing a first quantity of a valuable commodity stored at one or more secure deposit sites;

recording in memory of said computer system a second balance for a second account, said second balance representing a second quantity of the valuable commodity stored at said one or more secure deposit sites;

receiving a payment instruction at said computer system via a communications network, the payment instruction specifying a quantity of the valuable commodity, an account to be debited, and an account to be credited, wherein the account to be debited is the first account and the account to be credited is the second account;

in response to receipt of said payment instruction:

debiting by the computer system the first account; and crediting by the computer system the second account;

said method permitting persons to conduct said financial transactions without using national currencies, whereby an obligation of the first person to the second person is extinguished when said second account is credited, thereby eliminating payment risk.

19. The method of claim 18, wherein the valuable commodity is gold.

20. A computer program embodied on a computer-readable medium and comprising code that, when executed on a computer, causes the computer to perform the following steps:

receive payment instructions denominated in units of electronic gold, said payment instructions including at least an identification of a person who will receive a debit, a person who will receive a credit, and an amount of units of said electronic gold;

posting said payment instructions to debit and credit account data files of said persons to update data identifying a number of units of said electronic gold held for each said person;

whereby said persons may make and receive a payment without reliance on national currencies in conducting said financial transactions, thereby eliminating payment risk.

21. An electronic commodity-based system for conducting financial transactions, comprising:

at least one deposit site having secure facilities for storage of a valuable commodity;

an inventory of a valuable commodity stored in said secure facilities at said deposit site, said inventory including a quantity of units of said valuable commodity held at said deposit site for at least one identified account;

a computer system for processing data for accounting transactions denominated in said units of said valuable commodity, said computer system having at least one data storage device and data processing software that records a balance of units of said valuable commodity credited to each said account;

said software being operable to receive payment instructions transferring an interest in units of said valuable commodity from one account to another account;

said payment instructions including at least an identification of a first account that will receive a debit, and a second account that will receive a credit, an amount of units of said valuable commodity, said payment instructions thereby being used to update data regarding the balance of units of said valuable commodity credited to each said account;

said electronic commodity-based system permitting persons to conduct financial transactions without reliance on national currencies in conducting said financial transactions, whereby obligations of a person whose account receives said debit of said valuable commodity to another person whose account receives said credit of said valuable commodity, are extinguished upon posting of said payment instructions, thereby eliminating payment risk.

22. An electronic commodity-based system in accordance with claim 21, wherein the valuable commodity is gold.

23. An electronic commodity-based system for conducting financial transactions, comprising:

one or more secure deposit sites for storage of a valuable commodity;

an inventory of the valuable commodity stored in said one or more secure deposit sites;

a computer system for processing data associated with transactions denominated in units of said valuable commodity, said computer system being adapted to:

maintain a plurality of accounts, each account having a balance representing a quantity of the valuable commodity stored at said one or more secure deposit sites, wherein said accounts include a first account associated with a first person and a second account associated with a second person;

receive a payment instruction via a communication network, the payment instruction specifying a quantity of the valuable commodity, an account to be debited, and an account to be credited, wherein the account to be debited is the first account and the account to be credited is the second account;

in response to receipt of said payment instruction:

debit the first account; and credit the second account; and said electronic commodity-based system permitting persons to conduct said financial transactions without using national currencies, whereby an obligation of the first person to the second person is extinguished when said second account is credited, thereby eliminating payment risk.

24. An electronic commodity-based system in accordance with claim 23, wherein the valuable commodity is gold.

25. An electronic commodity-based system for conducting financial transactions, comprising:

one or more secure deposit sites for storage of a valuable commodity;

an inventory of the valuable commodity stored in said one or more secure deposit sites;

a computer system for processing data associated with transactions denominated in units of said valuable commodity, said computer system being adapted to:

maintain a plurality of accounts, each account having a balance representing a quantity of the valuable commodity stored at said one or more secure deposit sites, wherein said accounts include a first account associated with a first person and a second account associated with a second person;

receive a payment instruction via the Internet, the payment instruction specifying a quantity of the valuable commodity, an account to be debited, and an account to be credited, wherein the account to be debited is the first account and the account to be credited is the second account;

in response to receipt of said payment instruction:

debit the first account; and credit the second account; and said electronic commodity-based system permitting persons to conduct said financial transactions without using national currencies, whereby an obligation of the first person to the second person is extinguished when said second account is credited, thereby eliminating payment risk.

26. The system of claim 25 wherein the valuable commodity is gold.

27. A method of payment, using an electronic gold based payment system which does not permit fractional banking, comprising the steps of:

using a user computer operably connected to a communications network to obtain access an electronic gold based payment system;

entering one or more of an account number and a password to obtain access to a user account;

entering instructions on said user computer to be transmitted to said electronic gold based payment system, said instructions including a specification of a number of units of electronic gold to be transferred from said user account and an identification of a recipient to receive said payment of a number of units of electronic gold;

said method permitting a user to make a payment without reliance on national currencies in conducting said financial transactions, thereby eliminating payment risk.

28. A method in accordance with claim 27 wherein said identification of a recipient is an identification of a recipient account number.

29. An electronic gold based payment system which does not permit fractional banking, comprising:

a user computer operably connected to a communications network;

means for entering one or more of an account number and a password to said user computer to obtain access to a user account;

means for entering instructions on said user computer, said instructions including a specification of a number of units of electronic gold to be transferred from said user account and an identification of a recipient to receive said payment of a number of units of electronic gold;

said system permitting a user to make a payment without reliance on national currencies in conducting said financial transactions, thereby eliminating payment risk.

30. A system in accordance with claim 29 wherein said identification of a recipient is an identification of a recipient account number.

* * * * *

(12) INTER PARTES REEXAMINATION CERTIFICATE (0365th)

United States Patent
Turk

(10) Number: US 7,206,763 C1
(45) Certificate Issued: *Apr. 3, 2012

(54) METHOD AND SYSTEM FOR COMMODITY-BASED CURRENCY FOR PAYMENT OF ACCOUNTS

(75) Inventor: James J. Turk, North Conway, NH (US)

(73) Assignee: Goldmoney Network Limited, St. Helier, Jersey (IM)

Reexamination Request:
No. 95/001,708, Aug. 12, 2011

Reexamination Certificate for:
Patent No.: 7,206,763
Issued: Apr. 17, 2007
Appl. No.: 10/439,717
Filed: May 16, 2003

( * ) Notice: This patent is subject to a terminal disclaimer.

Related U.S. Application Data

(63) Continuation of application No. 09/340,566, filed on Jun. 28, 1999, now Pat. No. 7,143,062, which is a division of application No. 08/921,760, filed on Aug. 26, 1997, now Pat. No. 5,983,207, which is a continuation-in-part of application No. 08/465,430, filed on Jun. 5, 1995, now Pat. No. 5,671,364, which is a continuation-in-part of application No. 08/015,588, filed on Feb. 10, 1993, now abandoned.

(51) Int. Cl.
*G06Q 40/00* (2006.01)

(52) U.S. Cl. .......................... 705/39; 705/26.25; 705/37; 235/383

(58) Field of Classification Search ........................ None
See application file for complete search history.

(56) References Cited

To view the complete listing of prior art documents cited during the proceeding for Reexamination Control Number 95/001,708, please refer to the USPTO's public Patent Application Information Retrieval (PAIR) system under the Display References tab.

*Primary Examiner* — Stephen Ralis

(57) ABSTRACT

A system and method for permitting gold or other commodities to circulate as currency requires a network of system users that participate in financial transactions where payment is made in units of gold. The gold is kept in secure storage at a deposit site for the benefit of the users. The payments in gold are effected through a computer system having data storage and transaction processing programs that credit or debit the units of account of gold held for the account of each system user.

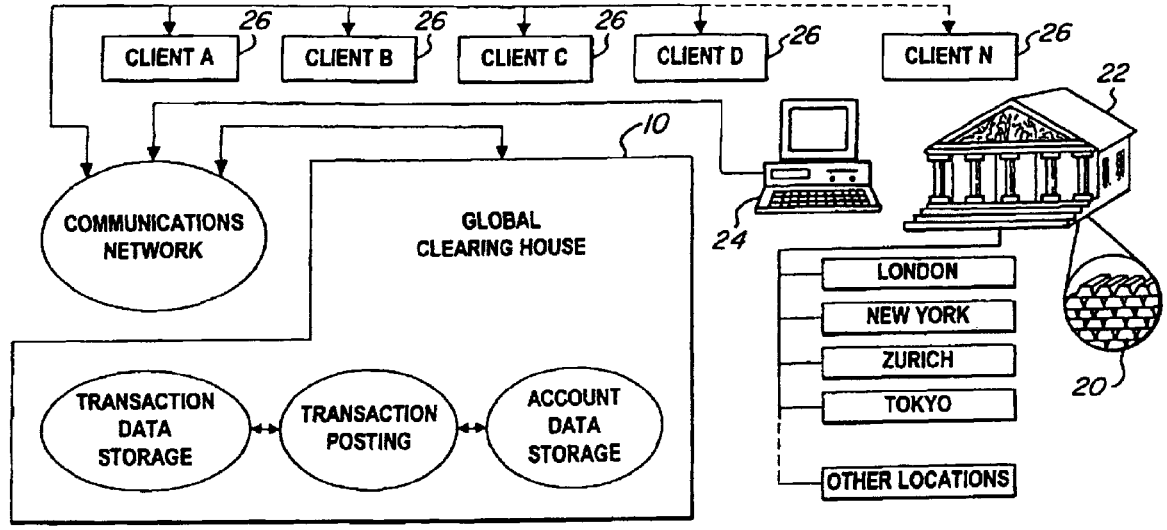

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-30 are cancelled.

* * * * *